(12) United States Patent
Huang et al.

(10) Patent No.: US 10,763,553 B2
(45) Date of Patent: Sep. 1, 2020

(54) BATTERY CHARGING APPARATUS AND BATTERY CHARGING METHOD

(71) Applicants: LITE-ON ELECTRONICS (GUANGZHOU) LIMITED, Guangzhou (CN); Lite-On Technology Corporation, Taipei (TW)

(72) Inventors: Yu-Hsiang Huang, Taipei (TW); Yu-Kang Lo, Taipei (TW)

(73) Assignees: LITE-ON ELECTRONICS (GUANGZHOU) LIMITED, Guangzhou (CN); Lite-One Technology Corporation, Taipei (TW)

( * ) Notice: Subject to any disclaimer, the term of this patent is extended or adjusted under 35 U.S.C. 154(b) by 428 days.

(21) Appl. No.: 15/802,377

(22) Filed: Nov. 2, 2017

(65) Prior Publication Data

US 2019/0131667 A1    May 2, 2019

(51) Int. Cl.
*H01M 10/44* (2006.01)
*H02J 7/00* (2006.01)
*H02J 7/35* (2006.01)

(52) U.S. Cl.
CPC .......... *H01M 10/441* (2013.01); *H02J 7/007* (2013.01); *H02J 7/0018* (2013.01); *H02J 7/0019* (2013.01); *H02J 7/35* (2013.01); *H02J 7/0077* (2013.01)

(58) Field of Classification Search
CPC .................................. H02J 7/35; H02J 7/0019
USPC .......................................... 320/101, 117, 138
See application file for complete search history.

(56) References Cited

U.S. PATENT DOCUMENTS

2009/0079384 A1* 3/2009 Harris ....................... B60L 7/14
                                                                 320/102
2012/0326512 A1* 12/2012 Yokoyama ................ G05F 1/67
                                                                   307/62

* cited by examiner

*Primary Examiner* — Richard V Muralidar
(74) *Attorney, Agent, or Firm* — JCIPRNET (57) ABSTRACT

A battery charging apparatus includes a charging power source, a plurality of charging circuits, a plurality of batteries, a plurality of switching circuits and a control circuit. The control circuit is configured to determine the type of charging power source based on a current-voltage curve of the charging power source, and to control conduction states of the switching circuits to connect the charging circuits and the batteries in series in a series charging mode and to connect the charging circuits and the batteries in parallel in an equalizing charging mode. A battery charging method of the battery charging apparatus is also introduced.

14 Claims, 6 Drawing Sheets

BATTERY CHARGING APPARATUS AND BATTERY CHARGING METHOD

BACKGROUND OF THE INVENTION

1. Field of the Invention

This disclosure relates to rechargeable batteries, and particularly relates to a battery charging apparatus and a battery charging method that is capable of charging the rechargeable batteries with a series charging mode and an equalizing charging mode.

2. Description of the Related Art

Battery packs are used as an energy storage device in a variety of electronic devices, including portable computers, personal digital assistants (PDAs), cellular phones, and cameras, etc. In conventional arts of designing battery chargers, designer has to either make use of a dedicated high voltage (HV) for charring HV battery system or use a large number of low voltage (LV) chargers to charge every one of the battery modules within the battery system, respectively. On one hand, using the dedicated HV for charging HV battery system may suffer from imbalance which jeopardizes lifespan of the battery system in the long run. Further, using plurality of LV chargers in maximum power point tracking (MPPT) to charge every one of the battery modules either contributes to worst tracking accuracy or charger each individual row battery module with a different amount of energy due to discrepancy in between power module.

Therefore, there is a need for a battery charging apparatus and a battery charging method that is capable of charging the batteries quickly while mitigating battery imbalance and extending longevity of the batteries.

SUMMARY OF THE INVENTION

The present disclosure is directed to a battery charging apparatus and a battery charging method which are capable of quickly charging batteries while mitigating battery imbalance, thereby extending the longevity of the batteries.

The battery charging apparatus may include a charging power source, a plurality of charging circuit, a plurality of batteries, a plurality of switching circuits and a control circuit. The control circuit is configured to control conduction states of the switching circuits, so as to individually charge the batteries by a charging rule.

In an embodiment of the present disclosure, the control circuit changes a load of the charging power source to change a current of the charging power source, so as to determine a type of charging power source based on the current-voltage curve of the charging power source.

In an embodiment of the present disclosure, the control circuit determines that the charging power source is a DC charging power source or a renewable energy source based on the current-voltage curve.

In an embodiment of the present disclosure, the control circuit determines that the charging power source is a DC charging power source in response to determining that the voltage of the charging power source does not change as the current of the charging power source changes or the change value of the voltage of the charging power source does not exceed the preset range. The control circuit determines that the charging power source is a renewable energy source in response to determining that the voltage of the charging power source changes as the current of the charging power source changes or the change value of the voltage of the charging power source exceeds the preset range.

In an embodiment of the present disclosure, the charging rule is that the control circuit controls the conduction states of the switching circuits to make the battery charging apparatus enter a series charging mode when power capacity of the plurality of the batteries do not reach a preset power capacity or enter an equalizing charging mode when the power capacity of any one of the plurality of the batteries reaches the preset power capacity. In the series charging mode, the plurality of charging circuits and the plurality of the batteries are coupled in series. In the equalizing charging mode, a x-th charging circuit, a x-th battery and a x-th switching circuit coupled between the x-th charging circuit and the x-th battery form an independent battery unit to receive power from the charging power source, wherein x=1~n, n is a positive integer.

The present disclosure also provides a battery charging method which includes the steps of: controlling conduction states of the switching circuits, so as to individually charge the batteries by a charging rule.

In an embodiment of the present disclosure, the battery charging method includes the steps of: changing a load of the charging power source to change a current of the charging power source; detecting the current and a voltage of the charging power source; and determining a type of the charging power source based on a current-voltage curve of the charging power source.

As per the aforementioned embodiments, the battery charging apparatus and the battery charging method according to the present disclosure may be utilized to determine the type of charging power source and to determine appropriate charging mode for charging the batteries, thereby achieving the effects of charging batteries quickly while mitigating battery imbalance and extending the longevity of the batteries.

The following embodiments are provided along with illustrations to facilitate the disclosure of the present disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Figure 1:
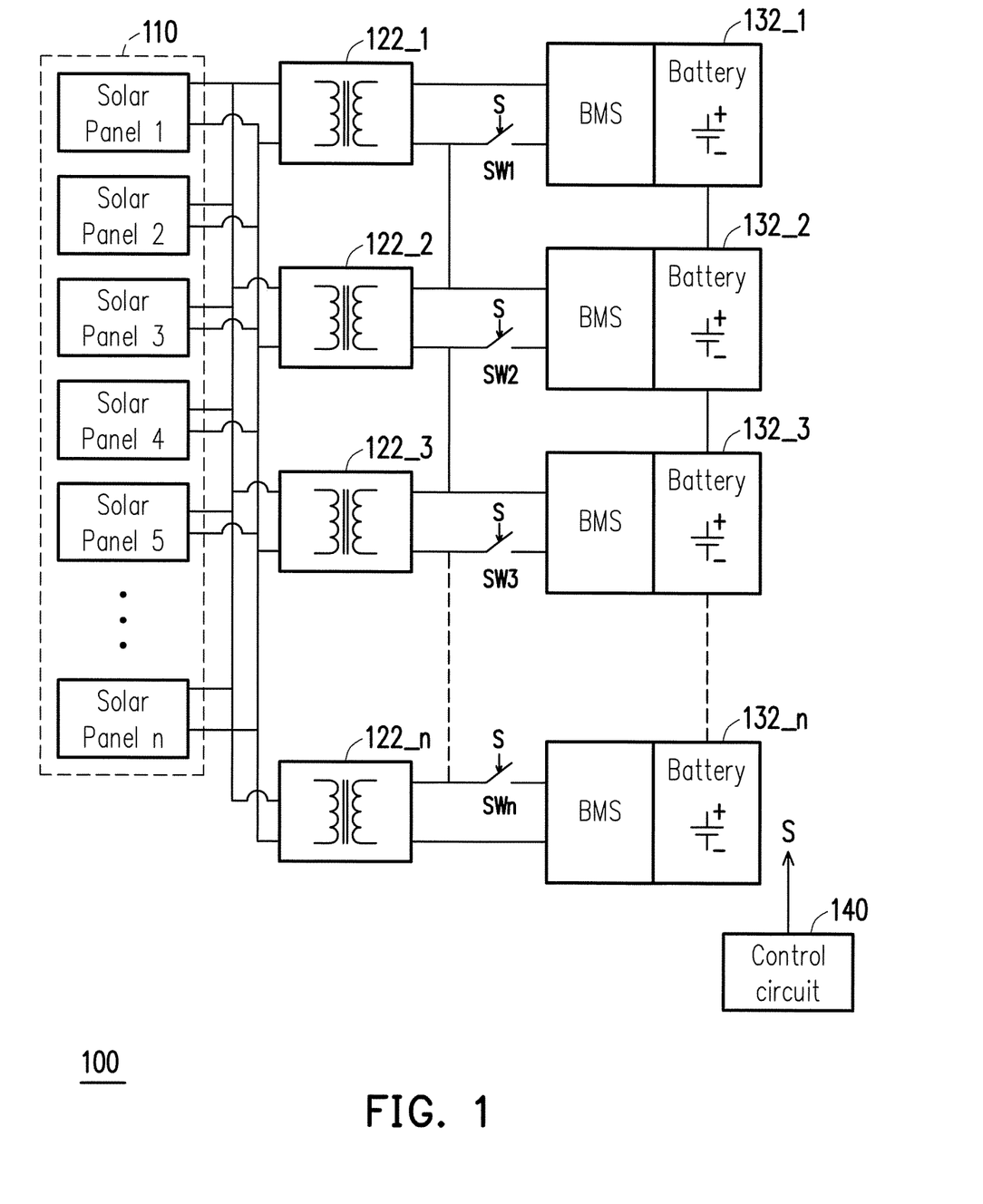
FIG. 1 illustrates a schematic diagram of a battery charging apparatus according to an embodiment of the present disclosure.

FIG. 1 illustrates a schematic diagram of the battery charging apparatus 100 which includes a charging power source 110, a plurality of charging circuits 122_1-122_$n$, a plurality of batteries 132_1-132_$n$, a plurality of switches SW1-SWn and a control circuit 140. The charging power source 110 is configured to supply charging power (energy) to the charging circuits 122_1-122_$n$ so as to charge the batteries 132_1-132_$n$. In FIG. 1, the charging power source 110 is shown as solar panels 1~n including a plurality of renewable energy sources (e.g., solar cells). However, the disclosure is not limited thereto, the charging power source 110 could be other sources such as wind turbine source, fuel cell source, battery backup, power converter fed by grid or power source, or a combination of one or more power sources. Also, the number of the solar panel doesn't limit the scope of the invention.

The charging circuits 122_1 to 122_$n$ are coupled to the charging power source 110 and are configured to convert the energy received from the charging power source 110 to the charging energy which is suitable for charging the batteries 132_1-132_$n$. The solar panels are coupled in parallel, for example, the solar panel 1 has a first output terminal electrically coupled to the first input terminals of the charging circuits 122_1-122_$n$ and the first output terminals of the solar panels 2-$n$, and the solar panel 1 has a second output terminal electrically coupled to the second input terminals of the charging circuits 122_1-122_$n$ and the second output terminals of the solar panels 2-$n$. The adjacent charging circuits are electrically coupled in series, for example, the second output terminal of the charging circuit 122_1 is electrically coupled to the first output terminal of the charging circuit 122_2, the second output terminal of the charging circuit 122_2 is electrically coupled to the first output terminal of the charging circuit 122_3. The batteries 132_1-132_$n$ are electrically coupled in series.

In an embodiment of the present disclosure, the charging circuits 122_1-122_$n$ may implement maximum power point tracking (MPPT) algorithm to optimize the match between the charging power source (e.g., solar panels) and the batteries or utility grid, thereby maximizing not only the charging efficiency but also energy harvest of the charging power source (e.g., solar panels). Since the MPPT algorithm are well known in the arts, the detail description of the MPPT charger is omitted herein. It would be appreciated that the charging circuits 122_1-122_$n$ are not limited to implement MPPT algorithm, the charging circuits 122_1-122_$n$ may be designed according to the type of charging power source (e.g., solar source, wind source, DC source, etc) and desired requirements.

The batteries 132_1-132_$n$ are electrically coupled to the charging circuits 122_1-122_$n$ through the switching circuits SW1-SWn. In detail, an output terminal of each of the charging circuits 122_1-122_$n$ is coupled to the corresponding battery, and another output terminal of each of the charging circuits 122_1-122_$n$ is coupled to the corresponding battery through the corresponding switching circuits SW1-SWn and one of the output terminals of the adjacent charging circuit. Each of the switching circuits SW1-SWn has a first terminal coupled to one of the charging circuits 122_1-122_$n$, a second terminal coupled to one of the batteries 132_1-132_$n$ and a control terminal coupled to the control circuit 140 to receive a control signal S. The switching circuits SW1-SWn are switched on or off the according to the control signal S to electrically connect or disconnect the batteries 132_1-132_$n$ from the charging circuits 122_1-122_$n$. The switching circuits SW1-SWn could be relays, breakers, MOSFETS, IGBTs, but the disclosure should not be limited thereto.

The control circuit 140 is configured to control conduction states of the switching circuit, so as to individually charge the batteries by a charging rule. For example, the control circuit 140 controls the conduction states of the switching circuits SW1-SWn to change a load of the charging power source 110 to change a current of the charging power source 110. The charging rule for the control circuit 140 to charge the batteries may be, for example, to control the conduction states of the switching circuits SW1-SWn to couple the charging circuits 122_1-122_$n$ and the batteries 132_1-132_$n$ in series (in the series charging mode) or to control the conduction states of the switching circuits SW1-SWn to couple the charging circuits 122_1-122_$n$ and the batteries 132_1-132_$n$ in parallel (in the equalizing charging mode).

The control circuit 140 is further configured to determine a type of the charging power source 110 based on a current-voltage curve of the charging power source 110. In an embodiment of the present application, the control unit 140 may obtain a current and a voltage of the charging power source 110, and determine whether the voltage of the charging power source 110 changes as the current of the charging power source changes. When the voltage of the charging power source 110 changes as the current of the charging power source varies, the control circuit 140 determines that the charging power source 110 is a green charging power source or a renewable charging power source (e.g., renewable energy source). When the voltage of the charging power source 110 does not change as the current of the charging power source varies, the control circuit 140 recognizes that the charging power source 110 is a DC charging power source. It should be noted that the renewable charging power source is not limited to solar cells, but can be any other renewable charging power source such as wind turbine, biomass, geothermal heat, hydropower, wave and tidal energy and the like.

In another embodiment of the present application, the control circuit 140 may determine the type of the charging power source 110 based on a change of the voltage of the charging power source 110. Particularly, the control circuit 140 may determine whether a change value of the voltage of the charging power source 110 exceeds a preset value or a preset range. When the change value of the voltage of the charging power source 110 exceeds the preset value or the preset range, the control circuit 140 determines that the charging power source 110 is a renewable power source such as solar cell. When the change value of the voltage of the charging power source 110 does not exceed the preset value or the preset range, the control circuit 140 determines that the charging power source 110 is a DC charging power source.

The battery charging apparatus may include a plurality of battery management systems (BMS) which are electrically coupled between the switching circuits SW1-SWn and the batteries 132_1-132_n. The BMS may be configured to monitor the status of the batteries, protect the batteries from operating outside of safe operating ranges, and control the charging state of the batteries. The monitored states of the batteries may include voltage, current, temperature, state of charge, state of health of the batteries.

In an embodiment of the present application, the control circuit 140 is integrated in the charging circuits 122_1-122_n or battery management systems of the batteries 132_1-132_n. In another embodiment, the control circuit 140 could be separated from the charging circuits 122_1-122_n and the batteries 132_1-132_n.

The control circuit 140 may include a single processor or multiple processors, and the number of the processors does not limit the disclosure. In the present embodiment, the control circuit 140 is, for example, a micro-controller unit (MCU), a central processing unit (CPU), or other microprocessor, a digital signal processor (DSP), a programmable controller, application specific integrated circuits (ASIC), a programmable logic device (PLD), or other similar devices.

Figure 2:
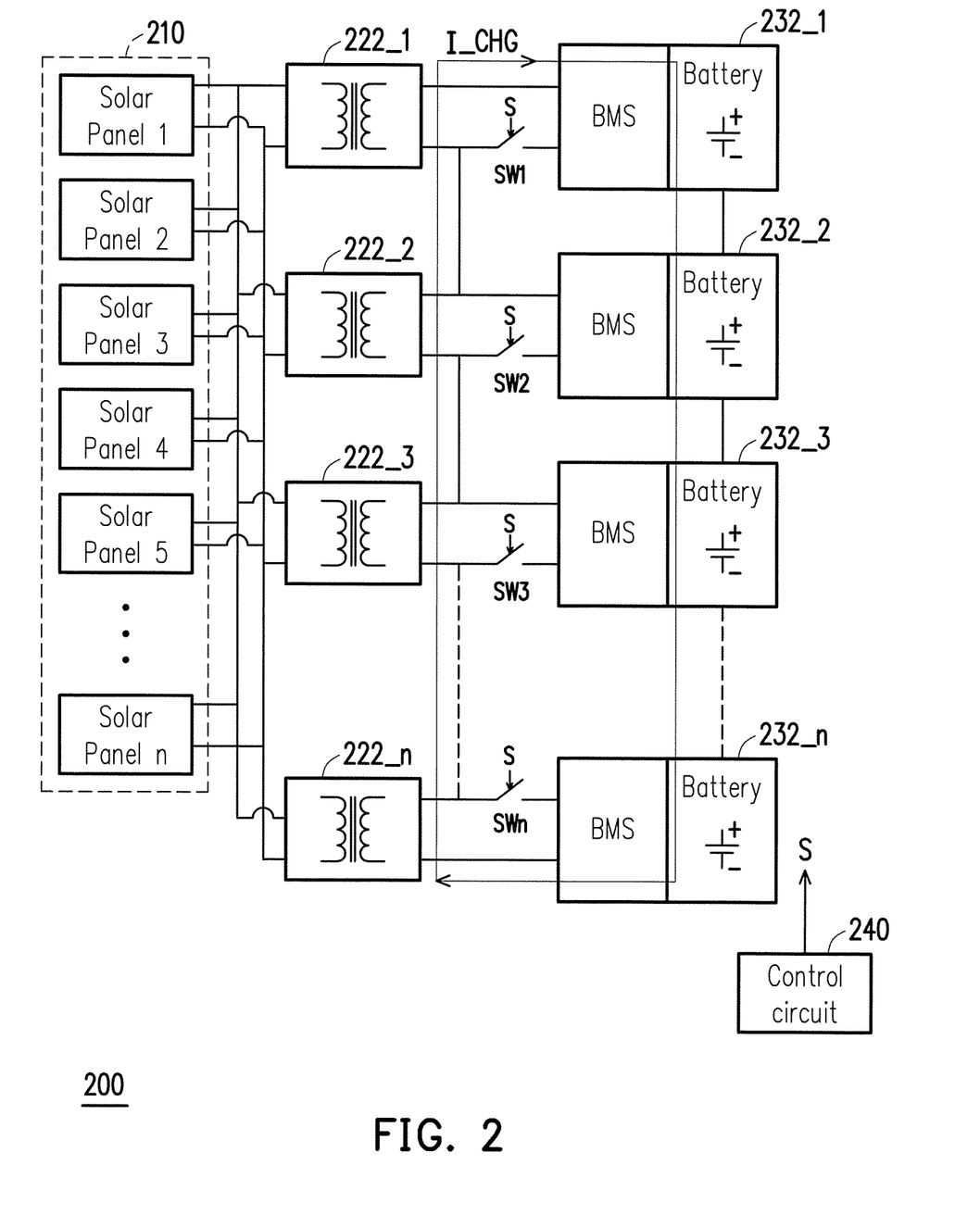
FIG. 2 illustrates a schematic diagram of a battery charging apparatus in a series charging mode according to an embodiment of the present disclosure.

FIG. 2 illustrates a schematic diagram of the battery charging apparatus 200 in the series charging mode. The components of the battery charging apparatus 200 shown in FIG. 2 are the same as the components of the battery charging apparatus 100 shown in FIG. 1, thus the detailed description of these components (charging power source 210, the charging circuits 222_1 to 222_n, the batteries 232_1 to 232_n and the control circuit 240) are omitted herein.

In FIG. 2, the battery charging apparatus 200 is operating in the series charging mode, where the control circuit 240 switches off the switching circuits SW1-SWn so that the charging circuits 222_1 to 222_n and the batteries 232_1 to 232_n are electrically connected in series. In this way, all of the batteries 232_1 to 232_n are charged with a same charging current I_CHG. In an embodiment of the present application, when a power capacity of the batteries 132_1-132_n are low (e.g., power capacity of batteries 132_1-132_n does not reach a preset power capacity), the series charging mode is activated to charge the batteries 232_1 to 232_n as series as possible without worrying about imbalance until the voltage of the batteries 232_1 to 232_n reaches a turnover point. When the power capacity of any one of the batteries 232_1 to 232_n reaches a turnover point, the battery charging apparatus is switched from the series charging mode to an equalizing charging mode.

Figure 3:
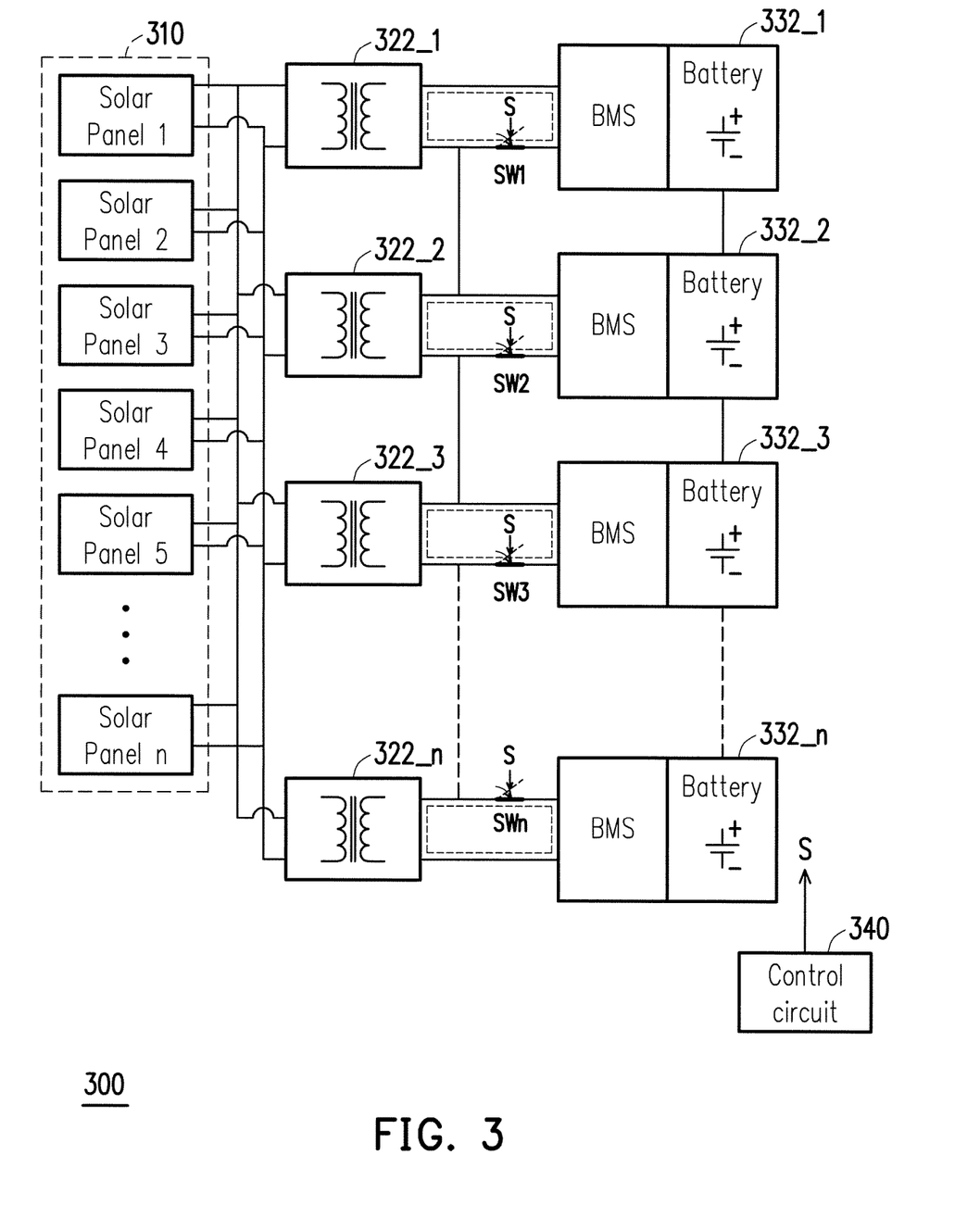
FIG. 3 illustrates a schematic diagram of a battery charging apparatus in an equalizing charging mode according to an embodiment of the present disclosure.

FIG. 3 illustrates a schematic diagram of the battery charging apparatus 300 in the equalizing charging mode. It should be noted that the components of the battery charging apparatus 300 shown in FIG. 3 are the similar to the components of the battery charging apparatus 100 shown in FIG. 1, thus the detailed description of the components (charging power source 310, the charging circuits 322_1 to 322_n, the batteries 332_1 to 332_n and the control circuit 340) of the battery charging apparatus 300 is omitted herein.

In FIG. 3, the battery charging apparatus 300 is operating in the equalizing charging mode, where the control circuit 340 turns on the switching circuits SW1-SWn so that the charging circuits 322_1 to 322_n are coupled to the corresponding batteries 332_1 to 332_n in parallel. As such, each of the batteries 332_1 to 332_n are charged by an individual charging circuit among the charging circuits 322_1 to 322_n, i.e. one charging circuit 322_x, one battery 332_x and one switching circuit SW_x coupled between the charging circuit 322_x and the battery 332_x may form an independent battery unit to receive power from the corresponding charging power source (e.g. solar panel x). In this way, it ensures that all of the batteries 332_1 to 332_n are charged to a substantially same target voltage level which may be set by a power management unit. As an example shown in FIG. 3, when the switching circuits SW1-SWn are turned on (closed status) in the equalizing charging mode, the solar panels 1~n are configured to charge the battery 332_1 via the charging circuit 322_1, charge the battery 332_2 via the charging circuit 322_2, and charge the battery 332_3 via the charging circuit 322_3 and the rest may be deduced by analogy. When either one of the batteries 332_1 to 332_n is fully charged (e.g., the power capacity of either one of the batteries 332_1 to 332_n is greater than or equal to a target voltage level), the charging process is terminated. In this way, it may significantly extend the longevity of the batteries, mitigate the imbalance, and prolong the lifespan of the batteries.

Figure 4:
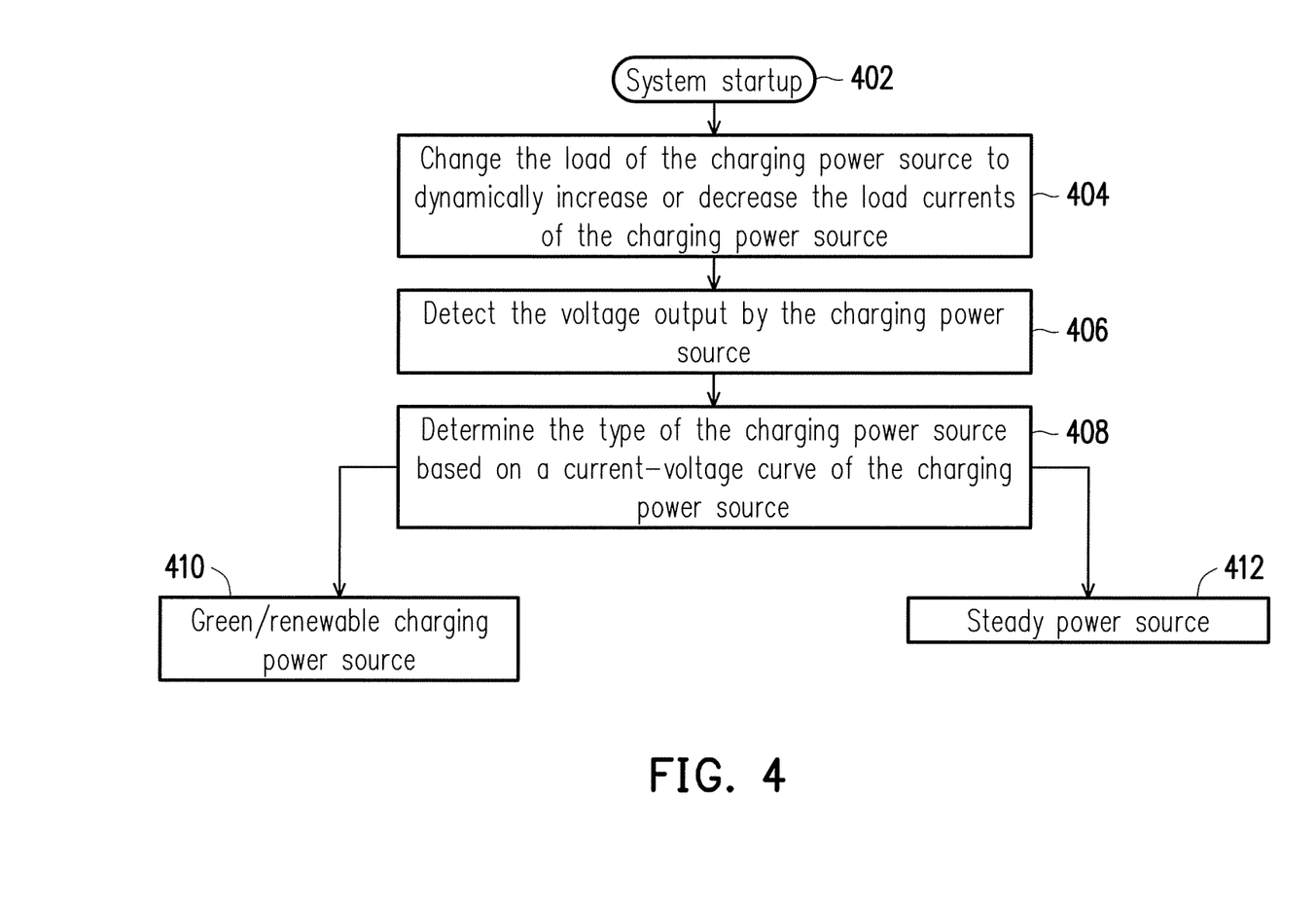
FIG. 4 illustrates a flowchart diagram for distinguishing a charging mode according to the voltage of charged batteries according to an embodiment of the present disclosure.

FIG. 4 illustrates a flowchart diagram for distinguishing a charging mode based on the change value of voltage of the charging power source. Referring to FIG. 1 and FIG. 4, after the system startups in step 402, the control circuit 140 changes the load currents of the charging power source 110 with a specific pattern and detects the output voltage of the charging power source 110. For example, the specific pattern means that one user can adaptively change the load of the charging power source to dynamically increase or decrease the load currents of the charging power source 110 (step 404), and detects the voltage output by the charging power source (step 406). The load currents of the charging power source 110 may be changed in any predetermined way by changing the load of the charging power source, which is not limiting the scope of the invention.

By performing the specific pattern of load current, the control circuit 140 may determine the type of the charging power source based on a current-voltage curve of the charging power source (step 408). For example, the voltage of the renewable charging power source (e.g., solar cells) will change significantly as load current changes, and the voltage of the DC charging power source does not change or may change insignificantly as load current changes. As such, the type of the charging power source (e.g., DC charging power source or renewable charging power source) could be determined according to the change value of the voltage of the charging power source.

For example, in step 408, the control circuit 140 may determine whether the voltage of the charging power source 110 changes significantly by recognizing whether the change value of the output voltage of the charging power source 110 is greater than a threshold value. If the change value of the output voltage of the charging power source 110 is greater than the threshold value, it is determined that the charging power source 110 is a green/renewable charging power source (step 410), and thus the MPPT algorithm may be utilized to optimize the energy harvest of the green/renewable charging power source.

Alternatively, if the change value of the output voltage of the charging power source 110 is insignificant, that is, the change value of the output voltage of the charging power source 110 is not greater than the threshold value, the charging power source 110 is recognized as a steady power source (step 412), for example, a DC charging power source. Appropriate charging modes and the appropriate charging control methods may be selected to charge the batteries. For example, one of the constant current (CC) mode, constant voltage (CV) mode and constant power (CP) mode can be selected to charge the batteries using the steady power source.

Figure 5:
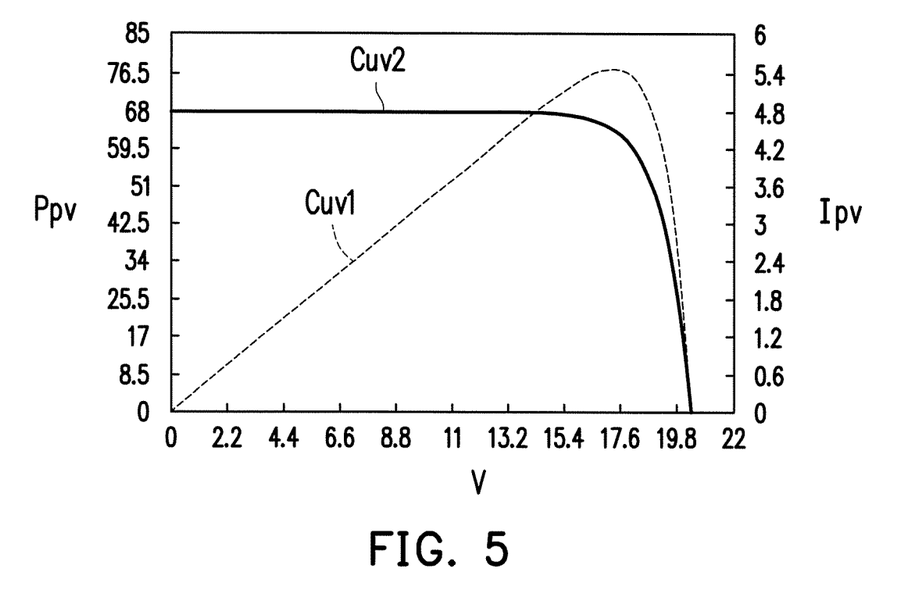
FIG. 5 illustrates an example of a power-voltage (P-V) curve and a current-voltage (I-V) curve of a renewable energy source.

FIG. 5 illustrates an example of a power-voltage (P-V) curve Cuv1 and a current-voltage (I-V) curve Cuv2 of the renewable charging power source. As shown in FIG. 5, when the voltage V of the renewable charging power source is increasing, the power Ppv of the renewable charging power source is varied with the increase of the voltage V. Particularly, the power Ppv of the renewable charging power source is increasing with the increase of the voltage V when the voltage V of the renewable charging power source is less than a voltage of maximum power point $V_{mpp1}$ (for example, 17.6V) and decreasing with the increase of the voltage V when the voltage V of the renewable charging power source is not less than the $V_{mpp1}$. The current Ipv of the renewable charging power source remains unchanged when the voltage V is less than a voltage of maximum power point $V_{mpp2}$ (for example, 14V) and is decreasing with the increase of the voltage V when the voltage V of the renewable charging power source is not less than the $V_{mpp2}$. In other words, the power Ppv of the renewable charging power source changes as the voltage V of the renewable charging power source changes, and the current Ipv of the green charging power source changes as the voltage V of the renewable charging power source changes to be equal to or greater than the voltage of maximum power point.

Figure 6:
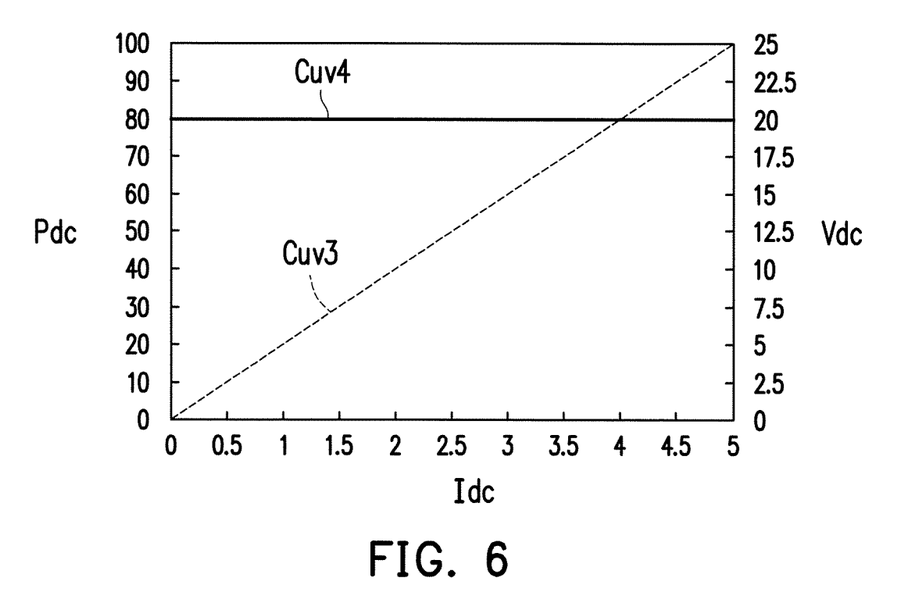
FIG. 6 illustrates an example of a power-current (P-I) curve and a voltage-current (V-I) curve of a DC power source.

FIG. 6 illustrates an example of a power-current (P-I) curve Cuv3 and a voltage-current (V-I) curve Cuv4 of a DC charging power source. As shown in FIG. 6, when the current Idc of the DC charging power source is increasing, the power Pdc of the DC charging power source increases whereas the voltage Vdc of the DC charging power source remains unchanged. In other words, the current Idc of the DC charging power source is independent and irrelevant to the voltage Vdc of the DC charging power source.

Based on the characteristic curves of the renewable charging power source shown in FIG. 5 and the characteristic curves of the DC charging power source shown in FIG. 6, the battery charging apparatus may determine the type of the power source (e.g., either renewable charging power source or DC charging power source) based on the current-voltage curve of the charging power source. Particularly, if the voltage of the charging power source substantially remains unchanged in response to the change of the current of the charging power source, then the charging power source should be a DC charging power source. By contrast, if the voltage of the charging power source changes significantly in response to the change of the current of the charging power source, then the charging power source should be a renewable charging power source. When the type of the charging power source is determined, appropriate charging algorithm corresponding to the determined type of the charging power source could be implemented according to corresponding charging behavior.

Figure 7:
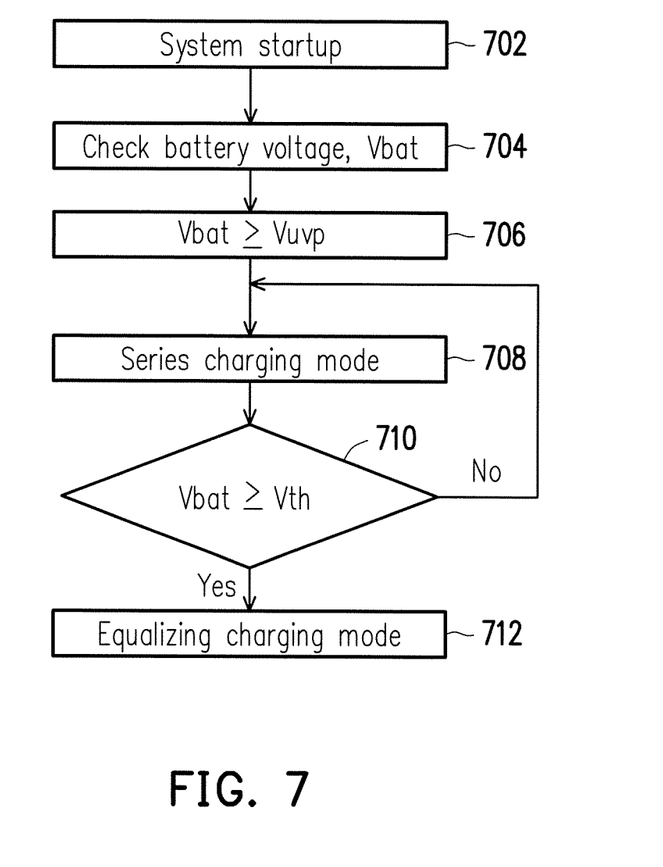
FIG. 7 illustrates a flowchart diagram for determining a charging mode based on a change value of voltage of a charging power source according to an embodiment of the present disclosure.

In addition, it should be noted that, the charging rule (i.e., the series charging mode and the equalizing charging mode) can be applied on the batteries the according to the power capacity of the batteries when the charging power source 110 is the green/renewable charging power source or the DC charging power source. For example, FIG. 7 illustrates a flowchart diagram for determining a charging mode based on a change value of voltage of a charging power source according to an embodiment of the present disclosure. Referring to FIG. 1 and FIG. 7, after the system startups, the control circuit 140 checks the battery voltage Vbat of the batteries (steps 702 to 704). In step 706, the control circuit 140 compares the battery voltage Vbat of each battery with a preset voltage Vuvp to determine whether the battery voltage is higher than or equal to the preset voltage Vuvp. If it is determined that the battery voltage of any one of the batteries is less than the preset voltage Vuvp, the series charging mode (series charging mode) is not triggered. If it is determined that the battery voltage Vbat of each battery is higher than or equal to the preset voltage Vuvp, the series charging mode are activated to quickly charge the batteries until the battery voltage Vbat reaches a threshold value Vth (steps 708 and 710), and the MPPT algorithm may be utilized to harvest most of energy out of the charging power source according to the charging current (e.g., the charging current I_CHG in FIG. 2) in the series charging mode when the charging power source 110 is a green/renewable charging power source. When the battery voltage Vbat reaches the threshold value Vth, the charging mode is switched from the series charging mode to the equalizing charging mode (steps 712), and the equalizing charging mode is used to charge the batteries until the charging process is terminated (the batteries are fully charged).

In summary, in exemplary embodiments of the disclosure, the conduction states of the switching circuit may be controlled to make the battery charging apparatus enter different charging modes such as the series charging mode and the equalizing charging mode. Additionally, the type of the charging power source (e.g., DC charging power source or a renewable energy source) may be determined according to the current-voltage curve of the charging power source, and the appropriate charging mode and appropriate charging algorithm could be applied according to the type of the charging power source and the power capacity of the batteries. Accordingly, the disclosure may achieve the effects of quickly charging batteries while mitigating battery imbalance and extending the longevity of the batteries.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A battery charging apparatus, comprising:
   a charging power source comprising a plurality of energy sources;
   a plurality of charging circuits coupled to the charging power source;
   a plurality of batteries, wherein each of the batteries corresponds to one of the energy sources;
   a plurality of switching circuits coupled between the plurality of charging circuits and the batteries; and
   a control circuit coupled to the switching circuits, controlling conduction states of the switching circuits, so as to individually charge the batteries by a charging rule,
   wherein each of the plurality of charging circuits comprises a first terminal and a second terminal, the first terminal is electrically coupled to one of the energy sources, the second terminal is electrically coupled to one of the batteries corresponding to the one of the energy sources, and the first terminal is electrically isolated from the second terminal.

2. The battery charging apparatus according to claim 1, wherein the control circuit changes a load of the charging power source to change a current of the charging power source, so as to determine a type of the charging power source based on a current-voltage curve of the charging power source.

3. The battery charging apparatus according to claim 1, wherein the control circuit determines that the charging power source is a DC charging power source or a renewable energy source based on a current-voltage curve.

4. The battery charging apparatus according to claim 1, wherein the control circuit determines that the charging power source is a DC charging power source when the voltage of the charging power source does not change as the current of the charging power source changes or the change value of the voltage of the charging power source does not exceed a preset range, and the control circuit determines that the charging power source is a renewable energy source when the voltage of the charging power source changes as the current of the charging power source changes or the change value of the voltage of the charging power exceeds the preset range.

5. The battery charging apparatus according to claim 1, wherein the charging rule is that the control circuit controls the conduction states of the switching circuits to make the battery charging apparatus enter a series charging mode when power capacity of the plurality of the batteries do not reach a preset power capacity or enter an equalizing charging mode when the power capacity of any one of the plurality of the batteries reaches the preset power capacity, wherein the plurality of charging circuits and the plurality of the batteries are coupled in series in the series charging mode, and a x-th charging circuit, a x-th battery and a x-th switching circuit coupled between the x-th charging circuit and the x-th battery form an independent battery unit to receive power from one corresponding charging power source in the equalizing charging mode, wherein x=1~n, n is a positive integer.

6. The battery charging apparatus according to claim 5, wherein the plurality of charging circuits perform maximum power point tracking in the series charging mode.

7. The battery charging apparatus according to claim 5, wherein the control circuit is integrated in the plurality of charging circuits or battery management systems of the plurality of the batteries.

8. A battery charging method of a battery charging apparatus, the battery charging apparatus comprises a charging power source having a plurality of energy sources, a plurality of charging circuits, a plurality of batteries and a plurality of switching circuits coupling to the plurality of the charging circuits and the plurality of the batteries, the battery charging method of the battery charging apparatus comprising:
controlling conduction states of the switching circuits, so as to individually charge the batteries by a charging rule,
wherein each of the plurality of charging circuits comprises a first terminal and a second terminal, the first terminal is electrically coupled to one of the energy sources, the second terminal is electrically coupled to one of the batteries corresponding to the one of the energy sources, and the first terminal is electrically isolated from the second terminal.

9. The battery charging method according to claim 8, further comprising:
changing a load of the charging power source to dynamically increase or decrease a load current of the charging power source;
detecting the load current and a voltage output by the charging power source; and
determining a type of the charging power source based on a current-voltage curve of the charging power source.

10. The battery charging method according to claim 9, further comprising:
determining whether the charging power source is a DC charging power source or a renewable energy source based on the current-voltage curve.

11. The battery charging method according to claim 8, further comprising:
the charging power source is determined as a DC charging power source when the voltage of the charging power source does not change as the current of the charging power source changes or the change value of the voltage of the charging power source does not exceed a preset range; and
the charging power source is determined as a renewable energy source when the voltage of the charging power source changes as the current of the charging power source changes or the change value of the voltage of the charging power exceeds the preset range.

12. The battery charging method according to claim 8, further comprising:
controlling the conduction states of the switching circuits to make the battery charging apparatus enter a series charging mode when power capacity of the plurality of the batteries do not reach a preset power capacity; and
controlling the conduction states of the switching circuits to make the battery charging apparatus enter an equalizing charging mode when the power capacity of any one of the plurality of the batteries reaches the preset power capacity, wherein the plurality of charging circuits and the plurality of the batteries are coupled in series in the series charging mode, and a x-th charging circuit, a x-th battery and a x-th switching circuit coupled between the x-th charging circuit and the x-th battery form an independent battery unit to receive power from one corresponding charging power source in the equalizing charging mode, wherein x=1~n, n is a positive integer.

13. The battery charging method according to claim 12, wherein the plurality of charging circuits perform maximum power point tracking in the series charging mode.

14. A battery charging apparatus, comprising:
a charging power source;
a plurality of charging circuits coupled to the charging power source;
a plurality of batteries;
a plurality of switching circuits coupled between the plurality of charging circuits and the batteries; and
a control circuit coupled to the switching circuits, controlling conduction states of the switching circuits, so as to individually charge the batteries by a charging rule,
wherein the control circuit determines that the charging power source is a DC charging power source or a renewable energy source based on a current-voltage curve.

* * * * *